(12) United States Patent
Gregorat

(10) Patent No.: US 6,327,243 B1
(45) Date of Patent: Dec. 4, 2001

(54) SYSTEM AND METHOD FOR PERFORMING A SEAMLESS SWITCHOVER FROM A PRIMARY PACKET ROUTER TO A SECONDARY PACKET ROUTER

(75) Inventor: Sandro Gregorat, Dallas, TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/128,431

(22) Filed: Aug. 3, 1998

(51) Int. Cl.[7] .................................................... H04J 12/26
(52) U.S. Cl. ......................................... 370/218; 370/412
(58) Field of Search .................................... 370/216, 217, 370/218–219, 220, 227, 360, 230, 235, 242, 244, 250, 389, 392, 395, 396, 412, 428, 429

(56) References Cited

U.S. PATENT DOCUMENTS

| | | | |
|---|---|---|---|
| 4,597,079 | * 6/1986 | Aoki et al. ............................ | 370/220 |
| 5,345,438 | * 9/1994 | Ozaki .................................. | 370/220 |
| 5,426,420 | * 6/1995 | Nagler ................................. | 370/360 |
| 5,471,460 | * 11/1995 | Tanabe ................................ | 370/218 |
| 5,671,213 | * 9/1997 | Kurano ................................ | 370/218 |
| 5,740,157 | * 4/1998 | Demiray et al. .................... | 370/218 |
| 5,771,225 | * 6/1998 | Iino .................................... | 370/217 |
| 5,854,786 | * 12/1998 | Henderson et al. ................. | 370/218 |
| 5,909,427 | * 6/1999 | Manning et al. .................... | 370/219 |
| 5,953,314 | * 9/1999 | Ganmukhi ........................... | 370/220 |
| 6,108,300 | * 8/2000 | Coile et al. ......................... | 370/217 |

* cited by examiner

Primary Examiner—Ricky Ngo
Assistant Examiner—Phuc Tran
(74) Attorney, Agent, or Firm—John C. Han

(57) ABSTRACT

There is disclosed a redundant switch comprising a primary controller capable of routing data packets from an input interface to an output interface and a secondary controller capable of performing data packet routing tasks performed by the primary controller after a switchover. The primary controller comprises: 1) an inbound queue capable of storing data packets inbound to the redundant switch; 2) an outbound queue capable of storing data packets outbound from the redundant switch; and 3) a control processor capable of processing a first data packet stored in the inbound queue and assigning an identifier to the first data packet, wherein the control processor further assigns the identifier to a second data packet, the second data packet associated with the first data packet and stored in one of the inbound queue and the outbound queue, wherein the first data packet is removed from the inbound queue only upon completion of all processing associated with the first data packet and wherein a removal of the first data packet from the inbound queue enables the second data packet to be transferred to the secondary controller during a switchover.

20 Claims, 3 Drawing Sheets

SYSTEM AND METHOD FOR PERFORMING
A SEAMLESS SWITCHOVER FROM A
PRIMARY PACKET ROUTER TO A
SECONDARY PACKET ROUTER

TECHNICAL FIELD OF THE INVENTION

The present invention is directed, in general, to packet routing systems and, more specifically, to a system for providing a seamless switchover from a primary packet routing device to a secondary packet routing device.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded.

A consequential development relating to the increased popularity of LANs has been the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed. These include packet switching protocols, such as X.25, ISDN, frame relay, and ATM, among others.

Packet switching involves the transmission of data in packets through a network. Each block of end-user data that is to be transmitted is divided into packets. A unique identifier, a sequence number and a destination address are attached to each data packet. The packets are independent and may traverse the data network by different routes. The packets may incur different levels of propagation delay, or latency, caused by physical paths of different length. The packets may also be held for varying amounts of delay time in packet buffers in intermediated switches in the network. The packets may also be switched through differing numbers of packet switches as they traverse the network, wherein each switch has an associated processing delay caused by error detection and correction.

As a result, the packets may arrive out-of-order at the destination node. However, the destination node uses the identification and sequencing information in each data packet to assemble the data packets back in the proper order before continuing to process the original end-user data block.

To enhance the reliability of a packet switched network, it is common practice to build the packet switches as redundant devices. Each packet switch contains a primary (also called "master" or "active") packet routing engine that ordinarily performs packet routing and a secondary (also called "slave" or "standby") packet routing engine that takes over from the primary packet routing engine upon failure or upon the occurrence of certain selected events.

However, the switchover (or failover) from a primary to a secondary packet routing engine is frequently a disruptive event. At the time of switchover, the primary packet routing engine typically contains unprocessed data packets in input buffers, processed data packets in output buffers, and in-process data packets that are currently being processed by the control processor of the primary packet routing engine. Since the in-process data may affect the contents of both the input buffers and the output buffers, the loss of this in-process data during switchover to the secondary causes service disruptions.

There is therefore a need in the art for an improved redundant data packet switch that provides a more seamless switchover from a primary packet routing engine to a secondary packet routing engine. In particular, there is a need in the art for an improved redundant data packet switch in which the secondary packet routing engine is able to identify in-process data held in the primary packet routing engine and is able to correctly re-process such in-process data after a switch-over has occurred.

SUMMARY OF THE INVENTION

To address the above-discussed deficiencies of the prior art, it is a primary object of the present invention to provide, for use in a packet switched network, a redundant switch comprising a primary controller capable of routing data packets from an input interface to an output interface of the redundant switch and a secondary controller capable of performing data packet routing tasks performed by the primary controller after a switchover event. According to one embodiment of the present invention, the primary controller comprises: 1) an inbound queue capable of storing data packets inbound to the redundant switch; 2) an outbound queue capable of storing data packets outbound from the redundant switch; and 3) a control processor capable of processing a first data packet stored in the inbound queue and assigning an identifier to the first data packet, wherein the control processor further assigns the identifier to a second data packet, the second data packet associated with the first data packet and stored in one of the inbound queue and the outbound queue, wherein the first data packet is removed from the inbound queue only upon completion of all processing associated with the first data packet and wherein a removal of the first data packet from the inbound queue enables the second data packet to be transferred to the secondary controller during a switchover.

The above-described embodiment introduces a novel and advantageous feature of the present invention. During normal operation and during a switchover operation, the primary controller does not allow the second data packet in the outbound queue to be transferred or processed in any way until processing of the first data packet is complete and the first data packet is removed from the inbound queue, thereby preventing erroneous redundant data transfers. If the second data packet were transferred before all processing of the first data packet were complete, the secondary controller would regenerate the second data packet after a switchover and the second data packet would be transferred to its final destination twice. Hence, the second data packet is never accessed until after first data packet is completely processed and removed from the inbound queue. Additionally, the second data packet in the outbound queue is discarded if the first data packet is still in the inbound queue at switchover time, since the secondary controller will regenerate the second data packet after transfer of the first data packet.

According to one embodiment of the present invention, input interface is switchable between the primary controller and the second controller.

According to another embodiment of the present invention, the output interface is switchable between the primary controller and the second controller.

According to still another embodiment of the present invention, the redundant switch further comprises an intersystem queue capable of transferring data packets from the primary controller to the second controller.

According to yet another embodiment of the present invention, the control processor transfers the second data packet from the outbound queue to the intersystem queue during a failover if the control processor determines that no data packet in the inbound queue is assigned the identifier also assigned to the second data packet.

According to a further embodiment of the present invention, the control processor reads the first data packet from the inbound queue.

According to a still further embodiment of the present invention, a reading of the first data packet by the control processor does not remove the first data packet from the inbound queue.

According to a yet further embodiment of the present invention, a plurality of data packets stored in the inbound queue and in the outbound queue may not be transferred to the secondary controller until a parent data packet from which the plurality of data packets are derived is removed from the inbound queue.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
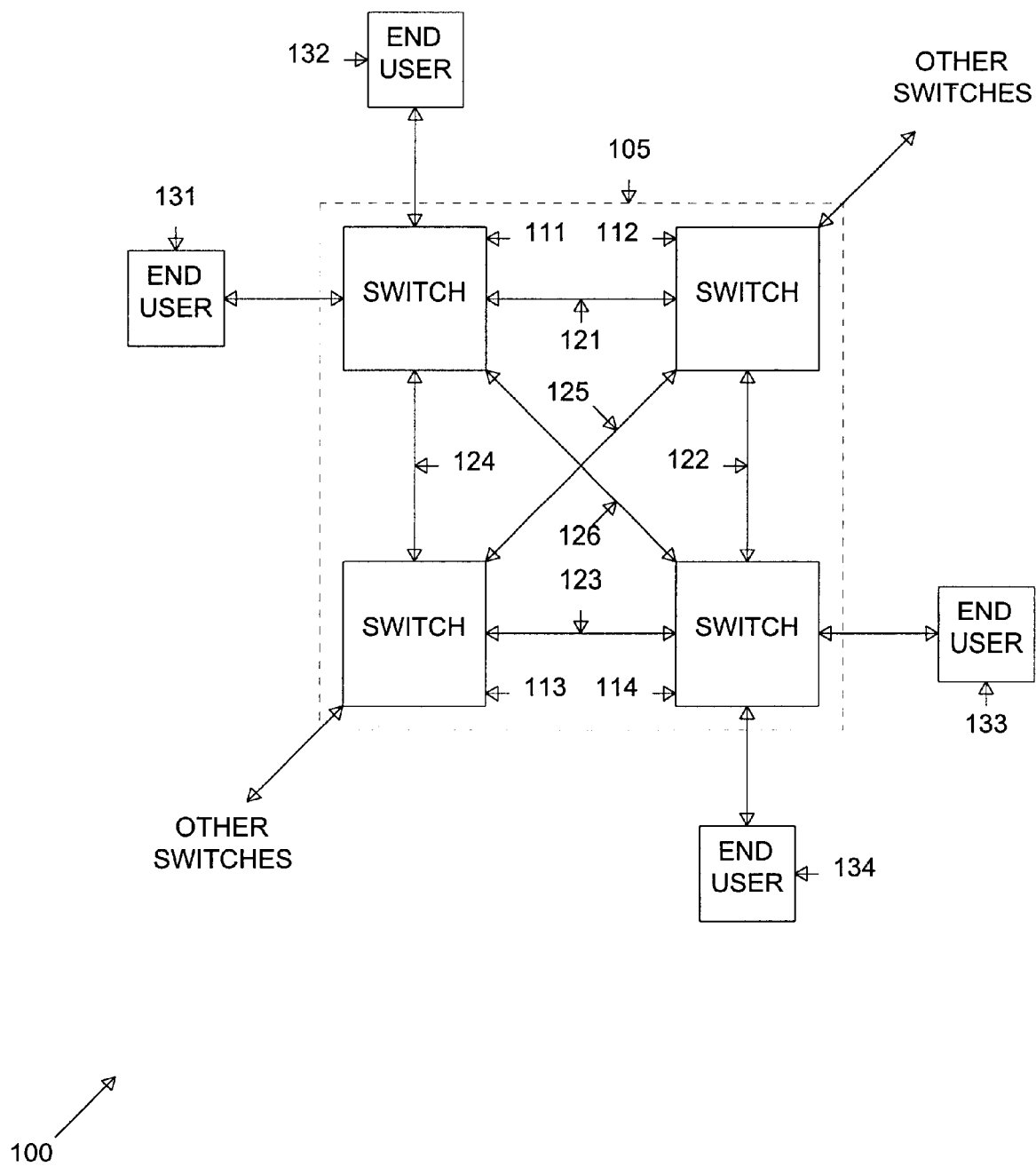
FIG. 1 illustrates an exemplary packet switching network containing redundant packet switches in accordance with the principles of the present invention.
Figure 2:
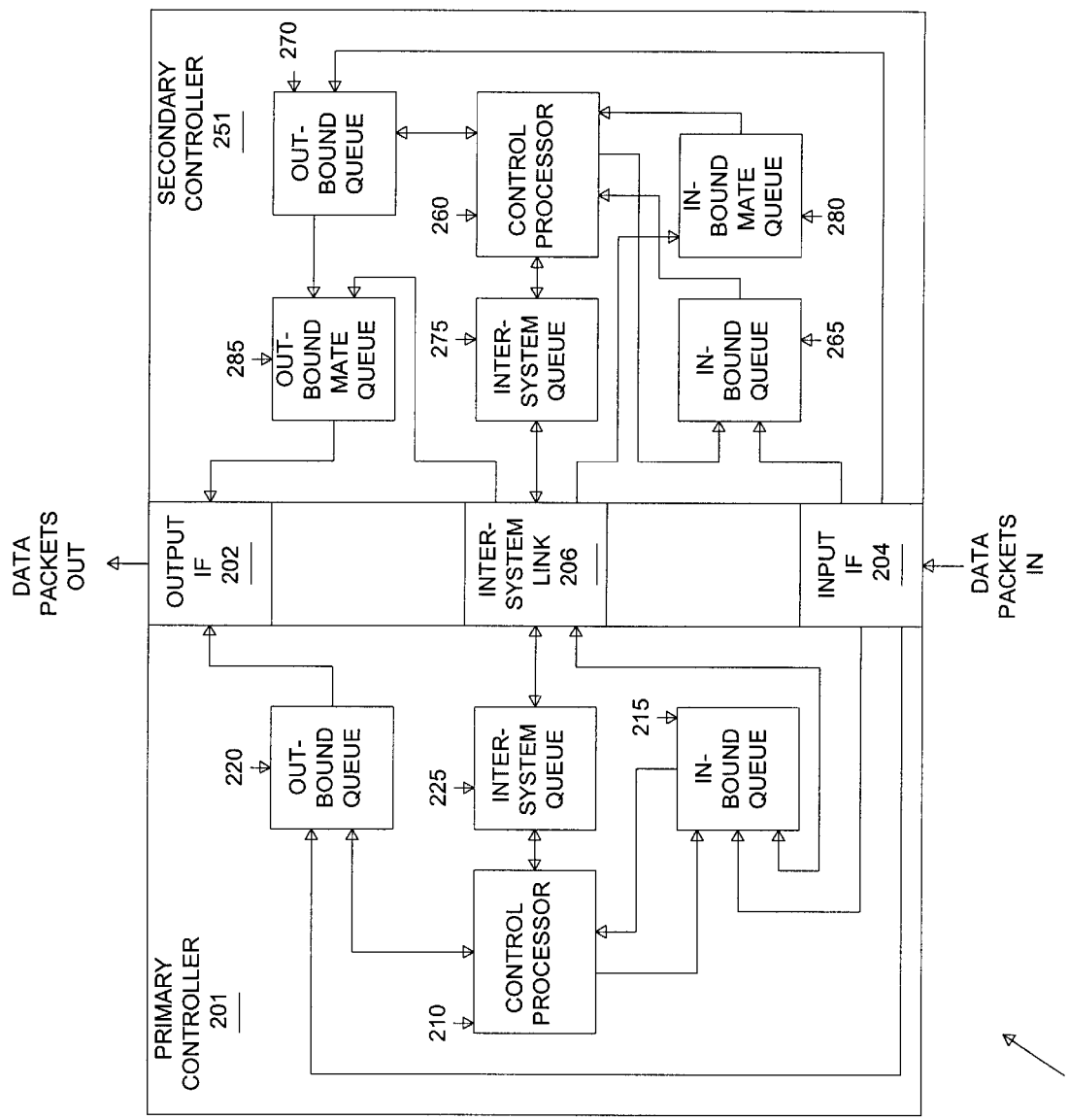
FIG. 2 illustrates a redundant packet routing engine in an exemplary redundant packet switch according to one embodiment of the present invention.
Figure 3:
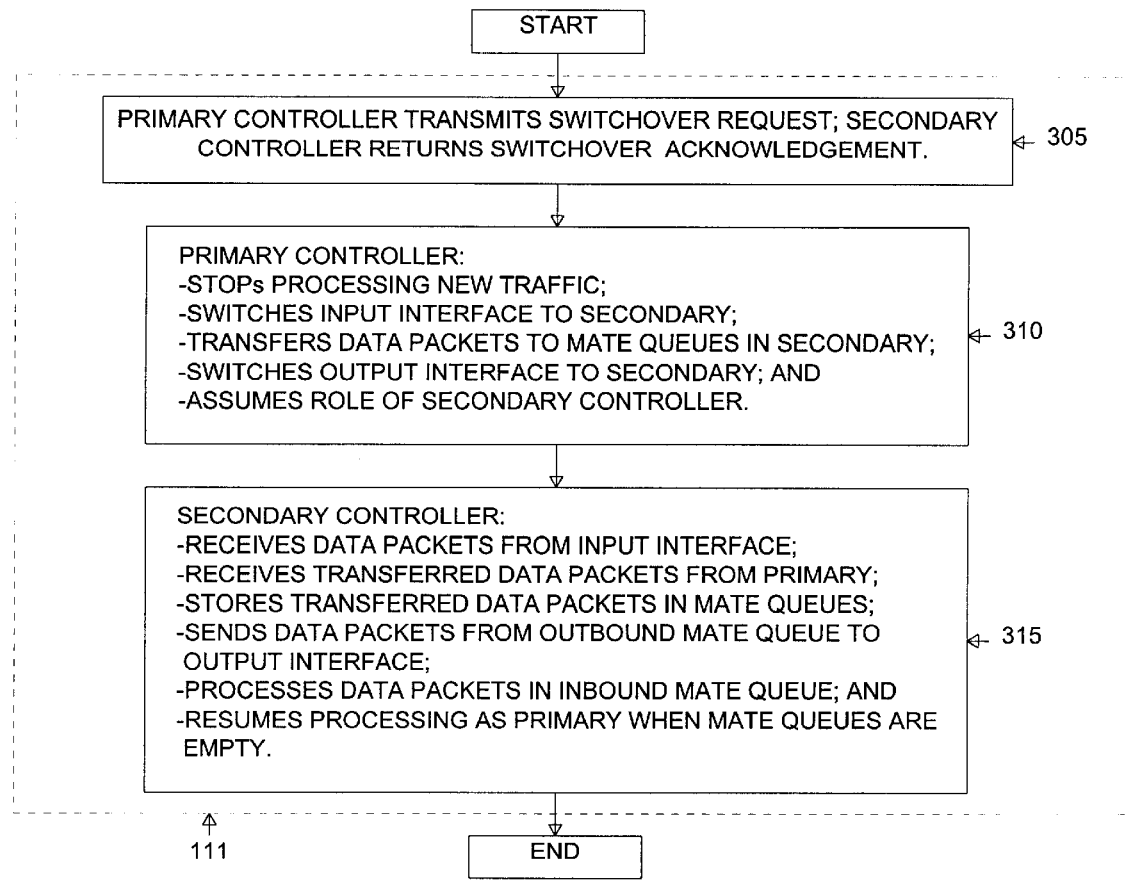
FIG. 3 illustrates the operation of the exemplary switch in FIG. 2 during a switchover operation according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switching network.

FIG. 1 illustrates an exemplary packet switching network 100 containing redundant packet switches 111–114 in accordance with the principles of the present invention. Packet switching network 100 contains a subnetwork 105, indicated by a dotted line, comprising packet switches 111–114, that interconnects end-user devices 131–134 with each other and with other switches (not shown) and other end-user devices (not shown) associated with packet switching network 100. Packet switches 111–114 are interconnected by data links 121–126. Subnetwork 105 is intended to be a representative portion of packet switching network 100, which may contain many other redundant packet switches similar to packet switches 111–114.

End-user devices 131–134 each may comprise any commonly known processing device, such as a telephone, a personal computer (PC), a fax machine, an office LAN, a network server, or the like, that may communicate via a packet switching network. For example, end-user 131 may comprise a remote network server that is sending a data file to end-user 133, which is a desktop PC. The data file that is to be transmitted is segmented into data packets in end-user 131. An identifier for the data transfer is appended to each data packet. A sequence number is also appended to each packet, as is a destination address associated with end-user 133.

Next, the data packets are transferred to packet switch 111. Packet switch 111 may transfer the data packets to end-user 133 by several physical paths. For example, packet switch 111 may send the data packets directly to packet switch 114 across data link 126. If the data traffic load on data link 126 is heavy, packet switch 111 may send some or all of the data packets indirectly to packet switch 114 via data link 121, packet switch 112, and data link 122. Alternatively, packet switch 111 may send some or all of the data packets indirectly to packet switch 114 via data link 124, packet switch 113, and data link 123. Packet switch 114 transfers the data packets to end user device 133, which uses the identifier information and the sequence numbers from each data packet to reassemble the original data file sent by end-user device 131.

To enhance the reliability of packet switching network 100, at least some of the switches therein, such as switches 111–114, are redundant systems that include a primary (or master) packet routing engine and a secondary (or slave) packet routing engine. The primary packet routing engine may switchover to the secondary packet routing engine upon the occurrence of a failure or upon a system command. The present invention provides a unique way to perform a seamless switchover of a redundant system performing packet routing or, in alternate embodiments, the "hot" replacement of a standalone packet router.

FIG. 2 illustrates the redundant packet routing engine in exemplary redundant packet switch 111 according to one embodiment of the present invention. The detailed description of packet switch 111 that follows is by way of example only. It should be understood that the redundant packet routing engine illustrated in FIG. 2 may be implemented in any one of packet switches 111–114, or any other packet switch in network 100. Furthermore, packet switch 111 may comprise additional circuitry, such as buffers, line drivers or other interface circuitry, that are unnecessary to the explanation of the present invention. For the purpose of clarity and simplicity, such additional circuitry is omitted from the drawings and from the descriptions that follow.

Packet switch 111 comprises a primary packet routing engine and a secondary packet routing engine, designated primary controller 201 and secondary controller 251, respectively. Primary controller 201 and secondary controller 251 share a switchable output interface (IF) 202 and a switchable input interface (IF) 204. Primary controller 201 and secondary controller 251 are also coupled to one another by a high-speed intersystem link 206 that is used to transfer data during a switchover.

Primary controller 201 comprises control processor 210 and the storage devices inbound queue 215, outbound queue 220, and intersystem queue 225. Input data packets received in input IF 204 that require additional processing by control processor 210 are stored in inbound queue 215. Input data packets received in input IF 204 that are "passing through" (i.e., do not require additional processing by control processor 210) may be stored directly in outbound queue 220. Outbound queue 220 buffers data packets that are in the process of being transferred out of the redundant switch 111 by output IF 202. Intersystem queue 225 buffers and transfers data between primary controller 201 and secondary controller 251 via intersystem link 206.

Like primary controller 201, secondary controller 251 also comprises control processor 260, inbound queue 265, outbound queue 270, and intersystem queue 275. Secondary controller 251 also comprises an inbound mate queue 280 and an outbound mate queue 285 that are used during switchover. Data packets, or messages, that are transferred into intersystem queue 275 are stored in the inbound mate queue 280 and the outbound mate queue 285, as described below.

After a switchover, when secondary controller 251 is acting as primary, inbound data packets received in input IF 204 that require additional processing by control processor 260 are stored in inbound queue 265. Inbound data packets received in input IF 204 that are "passing through" (i.e., do not require additional processing by control processor 260) may be stored directly in outbound queue 270. Outbound queue 270 buffers data packets that are in the process of being transferred out of the redundant switch 111 by output IF 202. Intersystem queue 275 buffers and transfers data between primary controller 201 and secondary controller 251 via intersystem link 206.

During normal operation, primary controller 201 is connected to input IF 204 and to output IF 202 and processes the data packets in inbound queue 215 and outbound queue 220. During this time, input IF 204 and output IF 202 are disconnected from secondary controller 251. The data packets in primary controller 201 fall into three categories: 1) inbound data packets stored in inbound queue 215 for further processing; 2) "passing through" data packets stored in outbound queue 220 for re-routing; and 3) "in-process" data packets that are currently being processed by control processor 210. Control processor 210 will frequently generate two or more internal data packets from a single inbound data packet. These internally generated data packets may be placed in outbound queue 220 or may be placed in inbound queue 215 for further processing by control processor 210.

The present invention associates all data packets in inbound queue 215 and outbound queue 220 with a "transaction" that is tracked to completion by control processor 210. A transaction is initiated when control processor 210 issues a GET command to retrieve an inbound data packet from the inbound queue 215. The inbound data packet retrieved by the GET command is deemed to be the "parent" data packet. The parent data packet in inbound queue 215 is marked with the transaction ID but is not removed from inbound queue 215. Subsequent data packets derived from the parent data packet are "child" data packets, whether they are placed in the inbound queue 215 or the outbound queue 220.

The GET command issued by control processor 210 assigns a transaction identifier (ID) to the parent data packet retrieved by the GET command and assigns the same transaction ID to all subsequent child data packets that are part of the same transaction. New data packets are queued with a PUT command. The transaction is terminated only when control processor 210 issues a RELEASE(ID) command.

The parent data packet may finally be removed from inbound queue 215 only after the RELEASE(ID) command is issued. The RELEASE(ID) command also makes the child data packets in inbound queue 215 and outbound queue 220 available for further processing. Prior to that time, the child data packets having the same transaction ID as the parent data packet in inbound queue 215 are unavailable for processing. Data packets that are not part of any active transaction may be retrieved from outbound queue 220 by control processor 210 using the USE command.

This aspect of the operation of primary controller 201 is an important aspect of the present invention. During normal operation and during a switchover operation, primary controller 201 does not allow child data packet(s) in outbound queue 220 to be transferred to output IF 202 or processed in any other way until processing of the corresponding parent data packet is complete and the parent data packet is removed from inbound queue 215. This restriction on accessing or processing the child data packets prevents erroneous redundant data transfers.

For example, if a parent data packet that is still in inbound queue 215 generates two child data packets and one or both of the child data packets is transferred out of redundant packet switch 111 immediately prior to a switchover operation, the subsequent transfer of the parent data packet to secondary controller 251 will cause secondary controller 251 to reprocess the parent data packet and thereby regenerate the two child data packets. As a result, one or both of the child data packets will be delivered twice to its ultimate destination. To prevent this, the child packets are never accessed until after the parent packet is completely processed and removed from inbound queue 215. Additionally, child data packets in outbound queue 220 are discarded if the parent data packet is still in inbound queue 215 at the time of a switchover operation, since the child packets will be regenerated anyway by secondary controller 251 when the parent data packet is transferred.

Transactions for which a RELEASE(ID) command has been issued may be transferred to the inbound mate queue 280 and the outbound mate queue 270 in secondary controller 251. If a transaction is terminated prior to the issuance of a RELEASE(ID) command, none of the child data packets for that transaction will be transferred to secondary controller 251. Advantageously, temporary internal data packets that are generated during the processing of a parent data packet are not transferred to the secondary 251. Secondary controller 251 needs to be updated only when the changes are established by a RELEASE(ID) command.

The DRAIN command moves N packets from one queue to another, up to the maximum number of data packets available. The DRAIN transfers packets in a FIFO order and removes the packets from a queue. The DRAIN command removes from a queue a child packet associated with an active transaction without transferring it to the secondary controller 251. Only parent data packets, or data packets not associated with any active transaction, are transferred to secondary controller 251.

Primary controller 201 monitors the active transactions by means of an active transactions list (ATL) that is maintained by control processor 210. Data packets entering inbound queue 215 have a transaction ID associated with them. The initial value is a default ID, such as NO ID. When a data packet is fetched, the GET command changes the ID to, for example, X. An entry for Transaction X is then placed at the head of the ATL. The parent data packet remains in the inbound queue 215.

The next GET command skips over any packet in inbound queue 215 associated with an active transaction. Hence, as second GET command will assign Y as the transaction ID of the next data packet. Transaction Y entry is then placed in the ATL after the Transaction X entry. Finally, a RELEASE (X) command terminates Transaction X command by removing the parent data packet from the inbound queue 215 and by removing the Transaction X entry from the ATL. Any child data packets of Transaction X that are still in the outbound queue 220 may then be transferred to secondary controller 251 after a switchover.

At switchover time, the DRAIN command is used to transfer the "useable" content of the inbound queue 215 and the outbound queue 220 to the intersystem queue 225. In the initial phase of a switchover, a sequence of DRAIN commands interleaves N data packets from outbound queue 220 with M packets from inbound queue 215 in intersystem queue 225.

FIG. 3 illustrates the operation of the exemplary switch 111 during a switchover operation according to one embodiment of the present invention. The switchover procedure consists of two (2) transition states: a primary-to-secondary state and a secondary-to-primary state. After a Switchover Request notification is sent to secondary controller 251 and a Switchover Acknowledge notification is returned (process step 305), primary controller 201 transitions to the primary-to-secondary state. In this state, primary controller 201: a) stops processing traffic; b) switches input IF 204 to secondary controller 251; c) transfers packets to the secondary controller 251; and d) switches output IF 202 to secondary controller 251 at completion of any pending output transfer operation (process step 310). When secondary controller 251 acknowledges termination of the packet transfer (Transfer Acknowledge notification) the primary controller 201 then becomes a secondary controller.

Secondary controller 251 transitions to the secondary-to-primary state upon reception of the Switchover Request notification. In this state, secondary controller 251: a) begins to receive data packets from input IF 204; b) receives data packets from primary controller 201 from receipt of a Transfer Start notification until receipt of a Transfer End notification and stores data packets in inbound mate queue 280 and outbound mate queue 285; c) transfers data packets from outbound mate queue 285 to output IF 202; d) processes data packets from inbound mate queue 265; and e) transitions to primary controller when inbound mate queue 280 and outbound mate queue 285 are empty and inbound queue 265 and outbound queue 270 are back to a normal level (process step 315).

In order to preserve the time-ordering of the data packets, control processor 260 in secondary controller 251 first processes the data packets in inbound mate queue 280 and outbound mate queue 285, thereby giving precedence to primary controller 201 packets. In this manner, secondary controller 251 resumes the I/O operations of switch 111 where primary controller 201 left off. Secondary controller 251 processes the newly arrived inbound data packets received from input IF 204 after the switchover only when primary controller 201 data packets are completely processed.

Although the present invention has been described in detail, those skilled in the art should understand that they can make various changes, substitutions and alterations herein without departing from the spirit and scope of the invention in its broadest form.

What is claimed is:

1. For use in a packet switched network, a redundant switch comprising a primary controller capable of routing data packets from an input interface to an output interface of said redundant switch and a secondary controller capable of performing data packet routing tasks performed by said primary controller after a switchover event, said primary controller comprising:

an inbound queue capable of storing data packets inbound to said redundant switch;

an outbound queue capable of storing data packets outbound from said redundant switch; and a control processor capable of processing a first data packet stored in said inbound queue and assigning an identifier to said first data packet, wherein said control processor further assigns said identifier to a second data packet, said second data packet associated with said first data packet and stored in one of said inbound queue and said outbound queue, wherein said first data packet is removed from said inbound queue only upon completion of all processing associated with said first data packet and wherein a removal of said first data packet from said inbound queue enables said second data packet to be transferred to said secondary controller during a switchover.

2. The redundant switch set forth in claim 1 wherein said input interface is switchable between said primary controller and said second controller.

3. The redundant switch set forth in claim 1 wherein said output interface is switchable between said primary controller and said second controller.

4. The redundant switch set forth in claim 1 further comprising an intersystem queue capable of transferring data packets from said primary controller to said second controller.

5. The redundant switch set forth in claim 4 wherein said control processor transfers said second data packet from said outbound queue to said intersystem queue during a failover if said control processor determines that no data packet in said inbound queue is assigned said identifier also assigned to said second data packet.

6. The redundant switch set forth in claim 1 wherein said control processor assigns said identifier to said first data packet when said control processor reads said first data packet from said inbound queue.

7. The redundant switch set forth in claim 6 wherein a reading of said first data packet by said control processor does not remove said first data packet from said inbound queue.

8. The redundant switch set forth in claim 6 wherein a plurality of data packets stored in said inbound queue and in said outbound queue may not be transferred to said secondary controller until a parent data packet from which said plurality of data packets are derived is removed from said inbound queue.

9. A packet switched network comprising:
   a plurality of nodes capable of transmitting and receiving data packets; and
   a plurality of packet switches for routing data packets between said plurality of nodes, at least one of said plurality of packet switches comprising a redundant switch, wherein said redundant switch comprises:
      a primary controller capable of routing data packets from an input interface to an output interface of said redundant switch and a secondary controller capable of performing data packet routing tasks performed by said primary controller after a switchover event, said primary controller comprising:
         an inbound queue capable of storing data packets inbound to said redundant switch;
         an outbound queue capable of storing data packets outbound from said redundant switch; and
         a control processor capable of processing a first data packet stored in said inbound queue and assigning an identifier to said first data packet, wherein said control processor further assigns said identifier to a second data packet, said second data packet associated with said first data packet and stored in one of said inbound queue and said outbound queue, wherein said first data packet is removed from said inbound queue only upon completion of all processing associated with said first data packet and wherein a removal of said first data packet from said inbound queue enables said second data packet to be transferred to said secondary controller during a switchover.

10. The packet switched network set forth in claim 9 wherein said input interface is switchable between said primary controller and said second controller.

11. The packet switched network set forth in claim 9 wherein said output interface is switchable between said primary controller and said second controller.

12. The packet switched network set forth in claim 9 further comprising an intersystem queue capable of transferring data packets from said primary controller to said second controller.

13. The packet switched network set forth in claim 12 wherein said control processor transfers said second data packet from said outbound queue to said intersystem queue during a failover if said control processor determines that no data packet in said inbound queue is assigned said identifier also assigned to said second data packet.

14. The packet switched network set forth in claim 9 wherein said control processor assigns said identifier to said first data packet when said control processor reads said first data packet from said inbound queue.

15. The packet switched network set forth in claim 14 wherein a reading of said first data packet by said control processor does not remove said first data packet from said inbound queue.

16. The packet switched network set forth in claim 14 wherein a plurality of data packets stored in said inbound queue and in said outbound queue may not be transferred to said secondary controller until a parent data packet from which said plurality of data packets are derived is removed from said inbound queue.

17. For use a redundant packet routing switch comprising a primary controller capable of routing data packets from an input interface to an output interface of the redundant switch and a secondary controller capable of performing data packet routing tasks performed by the primary controller after a switchover, a method of processing packet data in the primary controller comprising the steps of:
   storing data packets inbound to the redundant switch in an inbound queue;
   storing data packets outbound from the redundant switch in an outbound queue;
   assigning an identifier to a first data packet stored in inbound queue;
   processing the first data packet;
   assigning the identifier to a second data packet associated with the first data packet;
   storing the second data packet in one of the inbound queue and the outbound queue; and
   removing the first data packet from the inbound queue only upon completion of all processing associated with the first data packet, the step of removing the first data packet from the inbound queue enabling the second data packet to be transferred to the secondary controller during a switchover.

18. The method set forth in claim 17 wherein the input interface is switchable between the primary controller and the second controller.

19. The method set forth in claim 17 wherein the output interface is switchable between the primary controller and the second controller.

20. The method set forth in claim 15 comprising the further steps of:
   during a failover, determining whether a data packet in the inbound queue is assigned the same identifier assigned to the second data packet; and
   transferring the second data packet from the outbound queue to the secondary controller upon a determination that no data packet in the inbound queue is assigned the same identifier assigned to the second data packet.

* * * * *